United States Patent [19]

Valstyn

[11] Patent Number: 4,511,942
[45] Date of Patent: Apr. 16, 1985

[54] AUTOMATIC THROAT HEIGHT CONTROL FOR FILM HEADS

[75] Inventor: Erich P. Valstyn, Santa Barbara, Calif.

[73] Assignee: Computer & Communications Technology Corp., Santa Barbara, Calif.

[21] Appl. No.: 375,714

[22] Filed: May 7, 1982

[51] Int. Cl.³ .............................................. G11B 5/16
[52] U.S. Cl. ................................... 360/126; 360/122; 29/603; 51/281 R
[58] Field of Search ........ 360/126, 125, 127, 119–120, 360/110, 122; 57/281 R, 165.75–165.77; 29/603

[56] References Cited

U.S. PATENT DOCUMENTS 3,787,638  1/1974  Murai ........................... 360/122 X
3,821,815  6/1974  Abbott ............................. 360/110
4,155,106  5/1979  Muraoka et al. ................. 360/112
4,295,173  10/1981  Romankiw ....................... 360/125

Primary Examiner—John H. Wolff
Attorney, Agent, or Firm—Spensley, Horn, Jubas & Lubitz

[57] ABSTRACT

A lapping guide is provided to determine the position at which lapping of a thin film head to define pole faces should be terminated. Accurate positioning of the lapping guide with respect to the head is insured by forming various elements of the lapping guide during the same photolithographic process steps as those used to form elements of the head. The lapping guide may be used either as an electrical or optical guide. When used as an optical guide, a second lapping guide may be provided as an indicator that more frequent inspection is necessary.

7 Claims, 2 Drawing Figures

HEAD
~14~

LAPPING GUIDE
~16; 18~

SECONDARY
LAPPING GUIDE

AUTOMATIC THROAT HEIGHT CONTROL FOR FILM HEADS

BACKGROUND OF THE INVENTION

1. Field of the Invention

This invention relates to magnetic heads and more particularly to magnetic heads having a film structure.

Film heads are often fabricated utilizing photolithographic techniques to successively deposit a number of films over a substrate. These films include a pair of magnetic films separated by a plurality of insulating films. One or more turns of conductive material are deposited within the insulating films and operate as the sense winding of the head.

After the deposition process has been completed, the bottom of the substrate is milled, or lapped, to remove a portion of the magnetic material so as to define pole faces. One of the insulating layers extends between the magnetic layers to the pole faces. One or more additional insulating layers serve to separate the magnetic layers from the conductive turns within the body of the heads. One of these insulating layers has an edge which is located a predetermined distance from the pole faces. At this edge, the separation distance between the magnetic layers begins to increase over its value at the pole faces. The distance from the pole faces to the point at which the spacing between the magnetic films begins to become greater than the gap length is termed the "throat height". Typically, the gap length may be on the order of twenty microinches and the throat height on the order of forty microinches. The latter height is not critical as long as it is greater than zero (i.e., the lapping does not continue to the point where the magnetic layers begin to diverge) and is less than some predetermined maximum length (typically 50 microinches).

2. Description of the Prior Art

Automatic throat height control has been achieved in the past by the provision of a lapping guide (or sensor) which causes termination of the lapping process at the right time. However, because of the very small dimensions of the throat height, the positioning of the lapping guide becomes critical if correct throat height is to be achieved. Prior art lapping guides have not always been able to achieve the desired accuracy of positioning with respect to the insulating layers which define the point from which the throat height is measured.

Various lapping guides for film type magnetic heads are disclosed in U.S. Pat. Nos. 3,821,815 to Abbott et al., 3,787,638 to Murai and 4,155,106 to Muraoka et al. Despite the benefits provided by such sensors, they are not entirely satisfactory for the purpose of controlling throat height.

SUMMARY OF THE INVENTION

It is an object of the present invention to provide a lapping guide or sensor which may be used to accurately control the throat height in a magnetic film head. It is another object of the present invention to provide a lapping guide which takes into account the uncertainty inherent in the photolithographic processes used to form the various films.

These and other objects are achieved by providing a lapping guide near a head element. The guide is formed of a pair of sensor films which are in contact over a portion of their length and are separated over the remainder of their length by one or more insulating films. The point at which the sensor films separate, i.e., the edge of the insulating film, is offset from the point at which the magnetic films of the head element diverge. This offset is equal to the desired throat height. In order to accurately control the offset, the insulating films which determine its position are formed during the same photolithographic process steps as the insulating films of the head which define the point where the magnetic films diverge. The head is lapped to define pole faces and lapping is stopped when the connection between the sensor films is broken. The lapping guide can be used as an electrical sensor by connecting the sensor films to an electric circuit. Alternatively, the lapping guide may be used as an optical sensor by periodically inspecting the lapped surface to determine when contact between the sensor films is broken.

BRIEF DESCRIPTION OF THE DRAWINGS

The invention will now be described with reference to the accompanying drawings, wherein.

DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Figure 1:
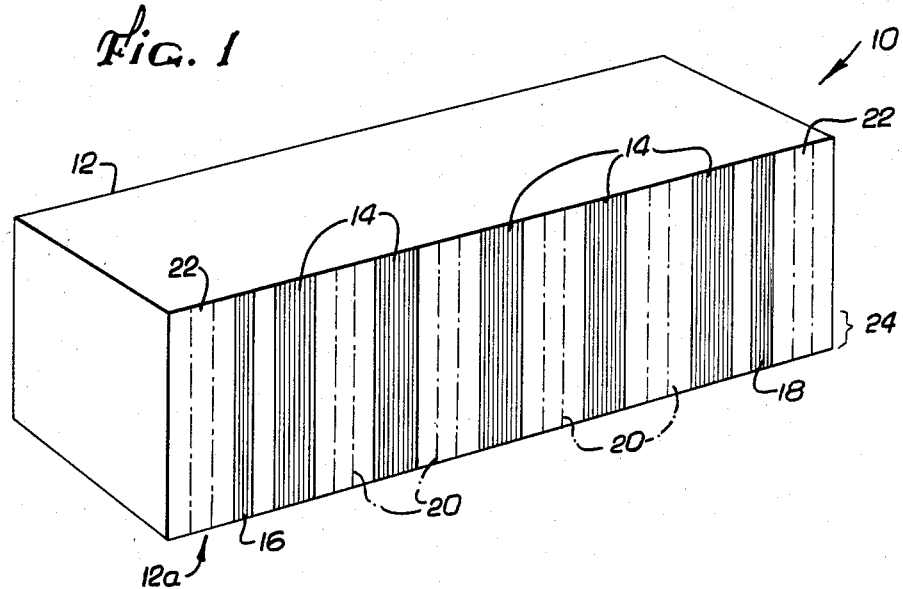
FIG. 1 is a diagrammatic perspective view of a head module incorporating a number of head elements and two or more lapping guides.

Referring to FIG. 1, a multiturn film head module 10 includes a substrate 12, which may for example be a semiconductor wafer, upon which are formed a plurality of individual head elements 14. These head elements are formed by successively depositing a number of films on the substrate using photolithographic techniques.

After the films have been deposited on the substrate 12, the bottom 12a of the substrate is lapped to define pole faces for each of the head elements. Determination of the point at which lapping is stopped is accomplished by means of a pair of lapping guides 16 and 18 located on either side of the head element array. Alternatively, more precise determination of the lapping point for each head element may be facilitated by providing a lapping guide 20 adjacent each head element. Secondary lapping guides 22 may also be provided to aid in the lapping process. Although the module 10 is shown as having five head elements, any number of head elements could be provided. Typical modules include between ten and twenty head elements.

Figure 2:
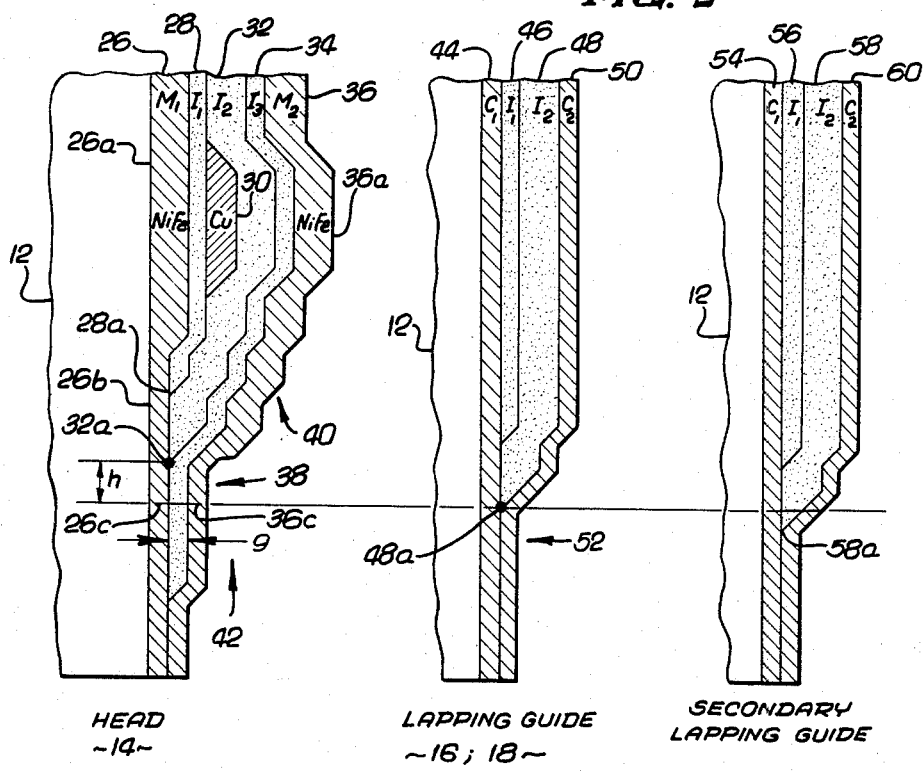
FIG. 2 is a sectional view of the tip of the head of FIG. 1, showing the positional relation between a head element and first and second lapping guides.

The head module 10 includes a tip portion 24, the cross-section of which is shown in detail in FIG. 2. Cross-sections are shown for a head element 14, the lapping guide 16 and the lapping guide 22. The head 14 includes a first layer of magnetic material 26 which is deposited on the surface of the substrate 12. This layer includes a portion 26a having a first thickness and a portion 26b having a second thickness. This can be accomplished either by double deposition (deposition of two films) or by deposition of a single relatively thick film and subsequent ion milling. The dual thickness for the magnetic layer is desirable in order to provide a small dimension for the pole face at the bottom of the head and a relatively large dimension, and thereby a more efficient magnetic structure, for the remainder of the head. A typical material for the magnetic layer 26 is a nickel iron alloy.

After formation of the layer 26, a first insulating layer 28 is deposited over a portion of the layer 26. Various materials may be used to form this layer. In the present embodiment of the invention, a hard baked photoresist material is utilized. Other suitable materials include $SiO_2$ and $Al_2O_3$. Photomasking techniques are used to define an edge 28a of the insulating layer.

After the first insulating layer has been deposited, conductive copper turns 30 are formed over the insulating layer. Only the lowermost turn is shown in FIG. 2. Typically, the head will include eight total turns. The insulating layer 28 serves to isolate the turns 30 from the magnetic layer 26. The position and number of turns is also determined by photomask techniques.

The next step in the formation of the head is the deposition of a second insulating layer 32, which in the present embodiment is also photoresist. This layer is relatively thick and extends over the edge 28a of the first insulating layer and contacts the magnetic layer 26. A photomask is used to define an edge 32a of the second insulating layer. The layer 32 is used to provide a relatively thick spacer between the two magnetic layers of the head.

After the second insulating layer has been formed, a third insulating layer 34 is deposited. In the present embodiment, this layer is formed of silicon dioxide ($SiO_2$). The layer 34 extends beyond the edge 32a of the second insulating layer and adjacent to the first magnetic layer 26. The purpose of the third insulating layer is to define the gap length g between the first magnetic layer 26 and a second magnetic layer 36. The magnetic layer 36 is deposited over the third insulating layer 34 and includes a relatively thick upper portion 36a and thin lower portion 36b. The thin portion 36b is separated from the thin portion 26b of the first magnetic layer solely by the third insulating layer 34. Thus, the head 14 includes a tip portion 38 comprised of the first and second magnetic layers separated by the third insulating layer, and a body portion 40 which includes the first and second insulating layers and conductive turns in addition to the magnetic layers and third insulating layer.

After the various layers have been deposited, the lower surface of the head is lapped in a direction corresponding to an arrow 42 in order to define pole faces 26c and 36c. Ideally, the lapping is continued until the pole faces are a distance h from the point 32a, i.e., the point where the magnetic layers 26 and 36 begin to diverge. The distance h is commonly referred to as the throat height of the head. This distance is typically less than 50 microinches. The throat height may be less, as long as the lapping does not continue past the point 32a. If lapping is continued past the point 32a, the distance between the magnetic layers at the pole faces will be greater than the distance g and the head will not function properly.

In order to determine when lapping should be terminated, the lapping guides 16 and 18 are provided. These guides are comprised of a first conductive layer 44 deposited on the substrate 12, a first insulating layer 46, a second insulating layer 48 and a second conductive layer 50. The conductive layers 44 and 50 are in contact with each other in an area 52 near the bottom of the substrate and are separated along the remainder of their length by the insulating layers 46 and 48. The conductors may be connected to an appropriate circuit at the top of the substrate in order to provide an electrical lapping termination indicator. The insulating layer 48 is formed so that its edge 48a is offset below the edge 32a of the insulating layer 32 of the head element by the throat height h. During lapping, contact between the conductors 44 and 50 will be broken when the lapping reaches the point 48a. When the conductors are connected to an appropriate circuit, the breaking of contact will cause a signal to be generated indicating that the lapping should be terminated.

Because of the extremely small dimensions for the throat height, the position of the lapping guide with respect to the head element (i.e., the offset distance between the edges 32a and 48a) is critical. A major difficulty arises in that the photolithographic processes which are used to establish the positions of the edges 28a and 32a of the insulating layers of the head have uncertainties associated with them which may result in the edges being established some distance above or below the exact design position. Although the photomasks used to define the edges 28a and 32a can be accurately made, variations in the exposure and removal of photoresist used to define the edges can result in the mispositioning of the edges with respect to their design location. In order to achieve the proper throat height, the level of the pole faces must be moved up or down by the same distance as the error in formation of the edge 32a. That is, the lapping process must be terminated later or sooner by the appropriate amount of time. The present invention achieves this objective by ensuring that the lapping guide is precisely positioned with respect to the edge 32a (i.e., the point 48a is offset from the point 32a by the distance h).

The exact position of the point 32a is a function of the processes used to define both the first insulating layer 28 and the second insulating layer 32. For example, if the edge 28a is established somewhat above its exact design position, this will to a certain extent affect the position at which the edge 32a is formed. In addition, even if the edge 28a is accurately defined, process variations in the formation of the layer 32 may result in mispositioning of the edge 32a. Thus, inaccuracy in the formation of the edge 32a may be a result of process variations in the formation of either or both of the insulating layers 28 and 32.

In order to insure that the lapping guide is accurately positioned with respect to the edge 32a, the insulating layers 46 and 48 are formed during the same photolithographic steps as the insulating layers 28 and 32, respectively. The position of the edge 46a of the first insulating layer of the lapping guide with respect to the edge 28a of the first insulating layer of the head can be accurately defined on a mask. Any process variations which affect the position of the edge 28a will similarly affect the position of the edge 46a, and the desired offset between the edges will therefore remain substantially unchanged. Similarly, the insulating layers 32 of the head and 48 of the lapping guide are formed during the same processing steps, and the desired offset between the edges 32a and 48a will thus be maintained. By forming the layers which define the position of the lapping guide at the same time as the formation of the layers which define the position of the head, the lapping guide will be accurately positioned despite any process variations.

The conductor layers 44 and 50 may be identical with the magnetic layers 26 and 36 of the head, so that the fabrication of the lapping guide does not involve any process steps which are not already used to fabricate the head. Such is not an absolute requirement, however, since the formation of the conductors 44 and 50 does not affect the position of the edge 48a.

The lapping guide 16 may also be used as an optical lapping guide. In such an instance, the lapped surface is periodically inspected during the lapping process. As long as the layers 44 and 50 appear in intimate contact, the lapping process is continued. As soon as the smallest spacing between the two layers becomes visible, the lapping process is stopped. It should be noted that in such an instance, the layers 44 and 50 need not necessarily be made of conductive material. In order to provide an indication that the end point of the lapping process is near and that the lapped surface must therefore be inspected at shorter intervals, the secondary lapping guide 22 may be provided. The guide 22 is comprised of conductor layers 54 and 60 and insulating layers 56 and 58 and is identical to the lapping guide 16 with the exception that the edge 58a is positioned a short distance below the edge 48a.

In summary, the present invention provides a lapping guide whose position is established during the same photolithographic process steps as is the position of the head element. Process variations which affect the position of the head element thus equally affect the position of the lapping guide, and the desired offset between the lapping guide and the head element is maintained. Contact between the conductor layers of the lapping guide will therefore be interrupted exactly at the point in time when the lapping process must be terminated to establish the desired throat height. With appropriate circuitry, this interruption of electrical contact can be used to automatically stop the lapping process. Alternatively, the lapping guide may be used as an optical guide. In such a case, a secondary lapping guide may be provided as an indicator that more frequent inspection of the lapped surface is necessary. The provision of the lapping guide does not require any additional processing steps over those used to form the head. When used in a multihead module, a pair of lapping guides are typically provided. Alternatively, a lapping guide may be provided for each head element in order to insure precise throat height.

I claim:

1. In a thin film magnetic head module of the type having one or more head elements, each of which is formed of a pair of magnetic film pole pieces separated by a first insulating film at the tip of the head element and the first insulating film and one or more additional insulating films along a remaining portion of the head element, wherein the tip extends from an edge of the additional film to a pole face established by lapping, wherein the head module includes at least one lapping guide offset from the edge of the additional film to indicate when lapping of the tip should terminate, the improvement wherein the position of the lapping guide is determined by one or more films which are formed during the same processing steps as the additional insulating films of the head, thereby increasing the precision of the lapping of the head.

2. The head module of claim 1 including first and second additional insulating films in each head element and the lapping guide includes a pair of sensor films separated by first and second insulating films in which the second insulating film has an edge which is offset from the edge of the additional film of the head element by a predetermined amount, wherein the first and second insulating films in the lapping guide are formed during separate processing steps and the pair of sensor films separate at the edge of the second film.

3. The head module of claim 2 wherein the sensor films are conductive films and form an electrical circuit which is broken when the films are separated during lapping.

4. The head module of claims 2 or 3 wherein the sensor films are formed in the same processing steps and of the same material as the magnetic films of the head element.

5. A head module according to claim 1 comprising a pair of lapping guides and a plurality of head elements located therebetween.

6. A head module according to claim 1 comprising a plurality of head elements and an equal plurality of lapping guides, one located adjacent each head element.

7. A head module according to claim 1 including a secondary lapping guide which is offset below the other lapping guide, wherein during lapping the secondary lapping guide provides an indication that the lapping process is near completion.

* * * * *